March 29, 1966 R. K. STERN ETAL 3,242,602
PERPETUAL CALENDAR
Filed April 22, 1963 3 Sheets-Sheet 1
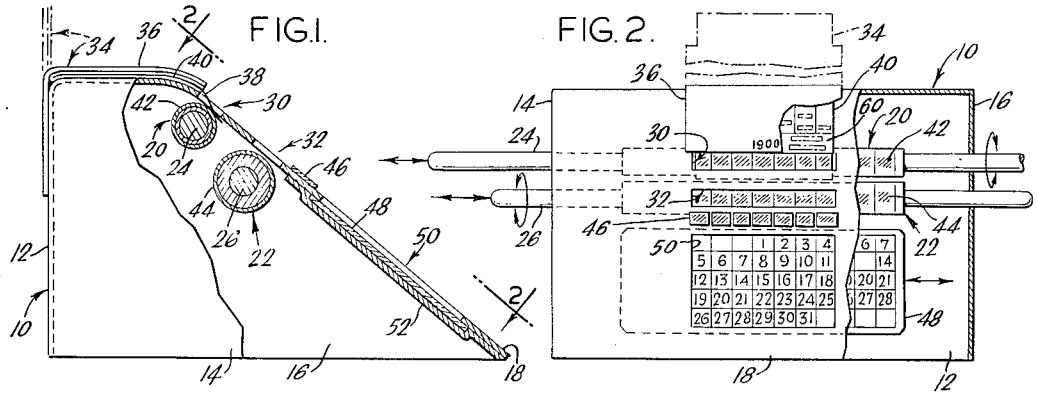
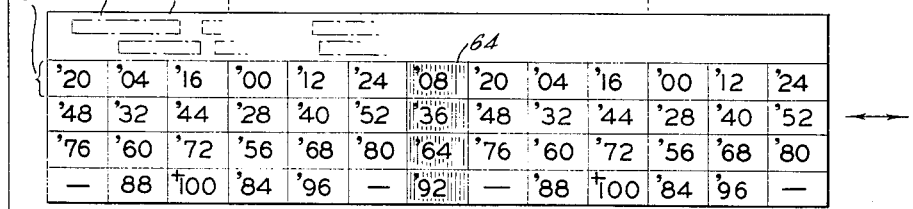
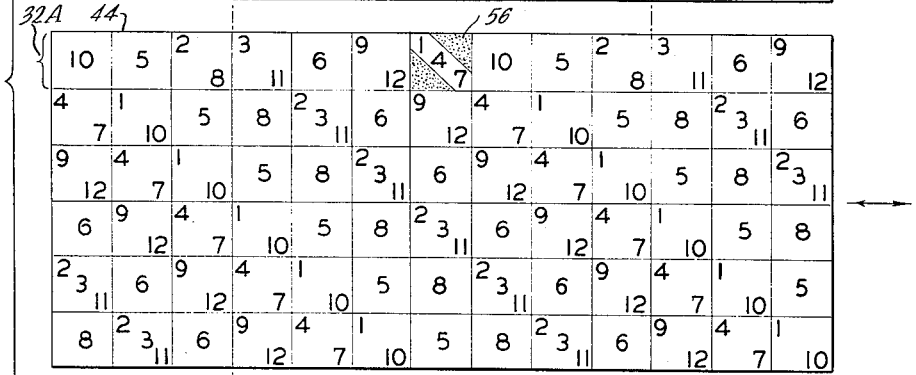
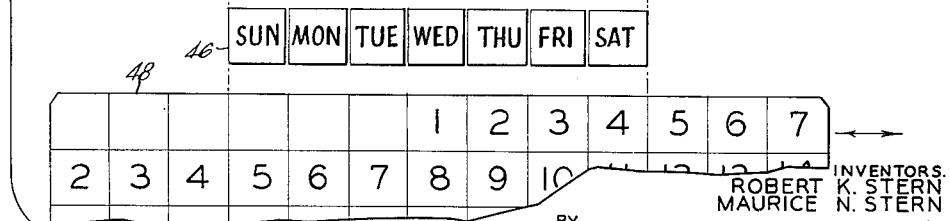
INVENTORS.
ROBERT K. STERN
MAURICE N. STERN
BY
Howson & Howson
ATTYS.

March 29, 1966 R. K. STERN ETAL 3,242,602
PERPETUAL CALENDAR
Filed April 22, 1963 3 Sheets-Sheet 2
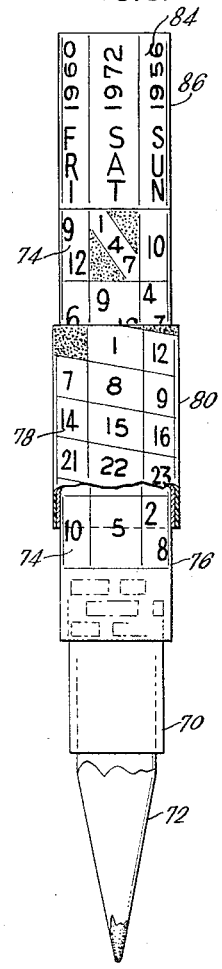
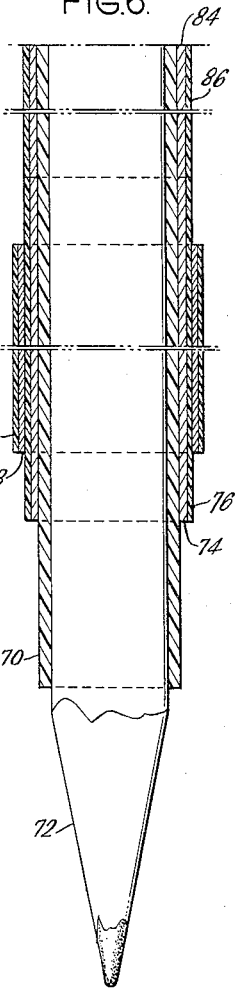
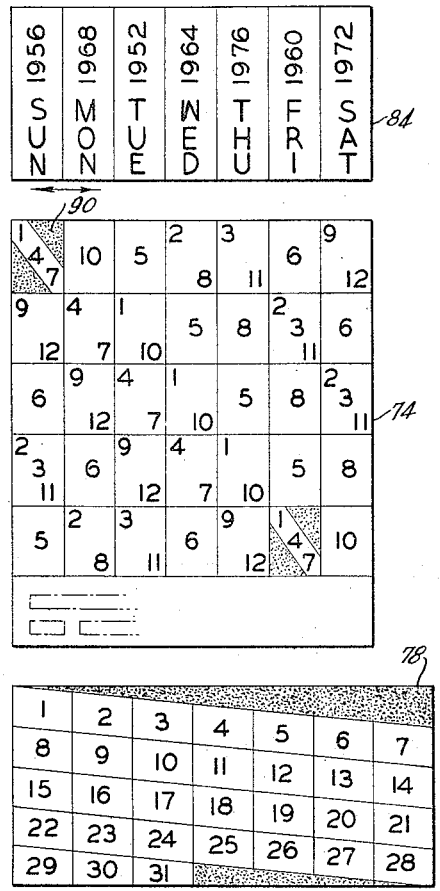
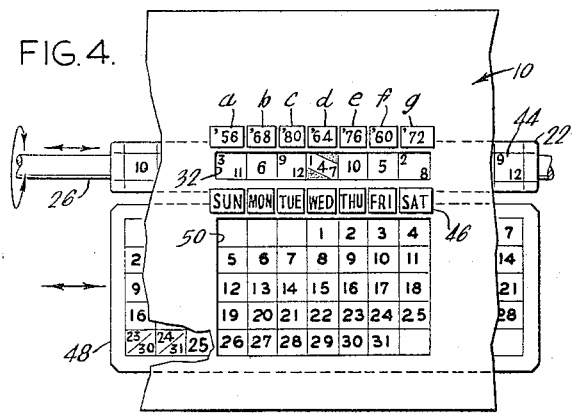
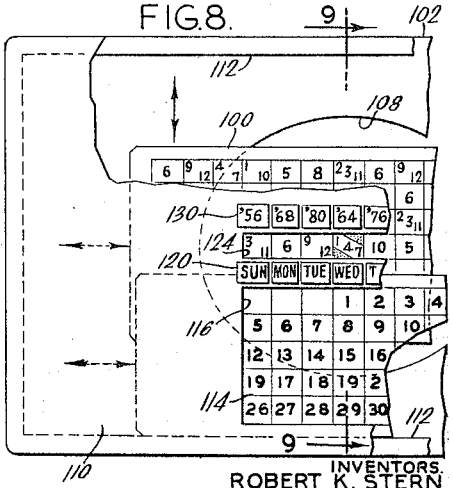
INVENTORS.
ROBERT K. STERN
MAURICE N. STERN
BY Howson & Howson
ATTYS.

March 29, 1966 R. K. STERN ETAL 3,242,602
PERPETUAL CALENDAR
Filed April 22, 1963 3 Sheets-Sheet 3
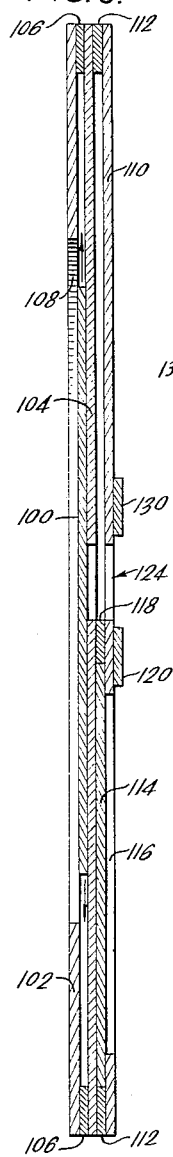
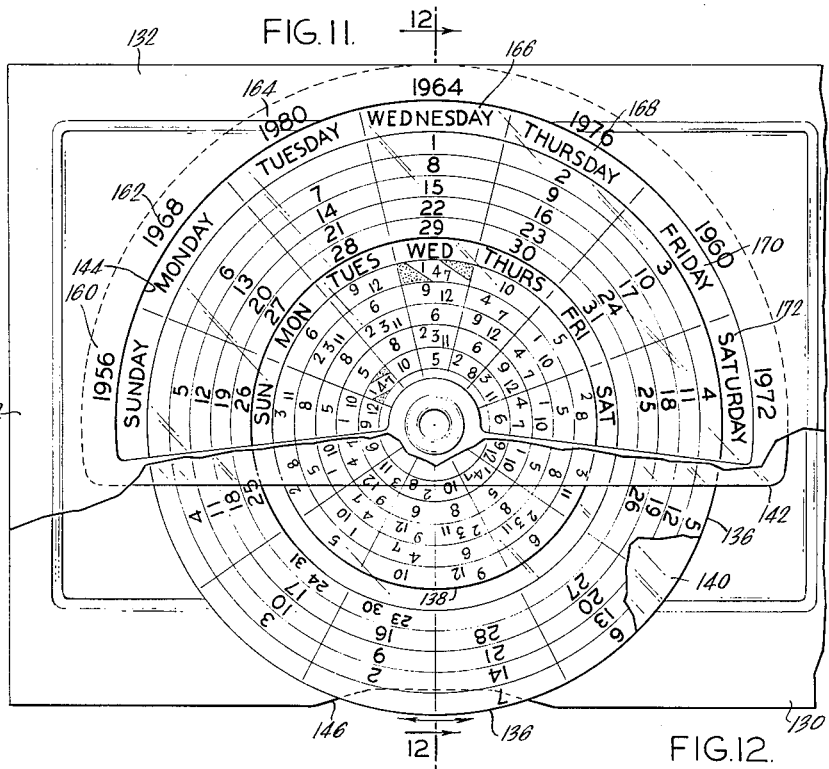
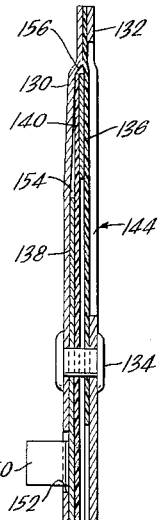
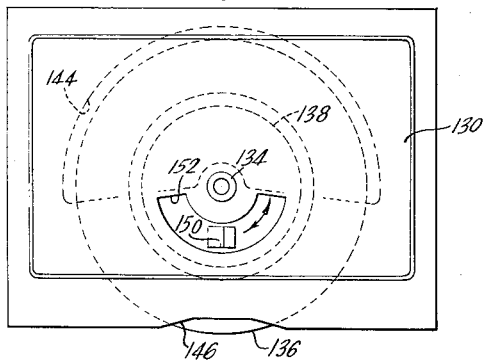
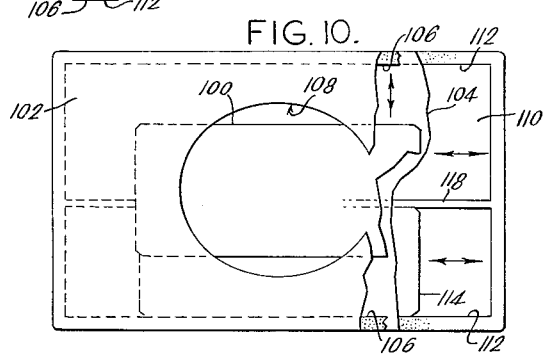
INVENTORS.
ROBERT K. STERN
MAURICE N. STERN
BY Howson & Howson
ATTYS.

United States Patent Office

3,242,602
Patented Mar. 29, 1966

3,242,602
PERPETUAL CALENDAR
Robert K. Stern, 1 Great Oaks Road, R.D. 2, New Hope, Pa., and Maurice N. Stern, 123—60 83rd Ave., Kew Gardens, N.Y.
Filed Apr. 22, 1963, Ser. No. 274,480
7 Claims. (Cl. 40—109)

This invention relates to perpetual calendars adjustable to provide calendar indications relating the days of the week to the days of the month for any month in any of a wide range of different years.

In U.S. Patent No. 2,998,666 of Maurice N. Stern, issued Sept. 5, 1961 there is described one form of perpetual calendar presenting a normal calendar indication of a selected month of a selected year in which the successive numbers of the days of the month are presented in the usual columnar arrangement in seven columns each headed by the name of a different successive day of the week. The indicator containing these columns of numbers is relatively rotatable with respect to the seven day-of-the-week headings in such manner that, by suitable relative rotation, a calendar display can be provided for any month. The proper rotational position for any selected month is determined by another associated and relatively rotatable month indicator which contains rows and columns of numbers indicative of the ordinal numbers of the months of the years. In a reference position of the month indicator with respect to the day-of-the-week headings, any number on the month indicator indicates a month of a particular year which begins on the day-of-the-week heading aligned therewith. By various motions of the month indicator in accordance with prescribed rules, this information can be provided for any of a large range of years. Knowing from such operations of the month indicator the day on which each month of a selected year begins, the day-of-the-month indicator can then be rotated to align the region thereof representing the first day of the month with the appropriate day-of-the-week heading and will then provide a proper calendar indication for the selected month of the selected year.

While very useful and convenient for many purposes, the above-mentioned perpetual calendar involves substantial references to information extrinsic to the calendar apparatus if it is to be used to provide calendar indications over a large range of years, and in some cases requires an appreciable degree of mental activity for its successful operation. In addition the structural arrangement specifically shown therein, in which is in the form of a pillbox, is not the most convenient for all purposes.

Accordingly it is an object of our invention to provide a new form of perpetual calendar.

Another object is to provide such a calendar which can be readily set to provide a proper calendar indication of any selected month in a wide range of years without recourse to extrinsic calendar data.

A further object is to provide new structural arrangements of such perpetual calendars which are especially convenient for particular uses.

In accordance with the invention a perpetual calendar is provided which comprises a supporting structure, a leap-year indicator thereon having a plurality of regions representative of different leap years, and a month indicator on said structure having columns of regions representing various months of the year, the leap-year indicator and the month indicator being relatively movable to align a particular identifiable column of the month indicator with any selected one of the regions of the leap-year chart. By so doing, the month indicator is positioned to provide indications, appropriate to a selected year, of which months begin on the various days of the week. This permits proper setting of a perpetual day-of-the-month indicator to provide a proper calendar indication of any selected month of any selected year within the range of the leap-year indicator. Preferably the day-of-the-month indicator and a day-of-the-week indicator are both mounted on the supporting structure in such positions as to permit ready alignment of the appropriate regions of the leap-year indicator, the month indicator, the day-of-the-week indicator and the day-of-the-month indicator.

In one preferred embodiment of the invention the leap-year indicator is adjustable to present different sets of leap-years covering a complete century; preferably, a century indicator is also provided on said supporting structure, and the leap-year indicator is alignable in different positions with respect to the century indicator to permit presentation of a proper calendar indication of any selected month of any selected year in any one of a large number of centuries.

In one especially advantageous form of the invention, the leap-year indicator and the month indicator are in the form of parallel rollers which are rotatable and axially slidable with respect to the supporting structure, while the century indicator and the day-of-the-week indicator are fixed on the supporting structure. In another convenient embodiment in which no century indicator is used, all indicators are concentric cylinders, the leap-year indicator and the day-of-the-week indicators are fixed with respect to each other, but otherwise all indicators are relatively rotatable with respect to each other. In other embodiments the entire calendar has a substantially planar form, as do each of the indicators of which it is comprised, and in one of these forms of the invention the month indicator and the day-of-the-month indicator are planar elements rotatable about a common axis, each containing circular rows and radial columns of indicia-bearing regions, while the leap-year indicator and the day-of-the-week indicator are fixed to the supporting structure and comprise indicia-bearing regions angularly-displaced with respect to said axis.

These and other objects and features of the invention will be more readily comprehended from a consideration of the following detailed description, in conjunction with the accompanying drawings, in which:

FIGURES 1 and 2 are an end view, partly broken away, and a front-face view, respectively, of a preferred embodiment of the invention especially adapted for desk use;

FIGURE 3 is an enlarged, developed diagram illustrating the nature of the various indicators and indicia-bearing regions of the embodiment of FIGURES 1 and 2;

FIGURE 4 is a fragmentary front view of a modification of the embodiment of FIGURES 1 and 2;

FIGURES 5 and 6 are a front elevation view and a sectional view, respectively, of an embodiment of the invention adapted for application to the end of a pencil or similar article;

FIGURE 7 is an enlarged, developed diagram illustrating the nature of the various indicators and indicia-bearing regions of the embodiment of FIGURES 5 and 6;

FIGURES 8, 9 and 10 are a fragmentary front view, a side sectional view and a back view, respectively, of a further embodiment of the invention; and FIGURES 11, 12 and 13 are front, sectional and back views, respectively, of still another embodiment of the invention.

Referring now to the specific embodiments of the invention shown in detail in the drawings, FIGURES 1, 2 and 3 relate to a form of the invention particularly adapted for use on a flat horizontal surface such as a desk top. A support structure 10 of any convenient material has a back 12 and two ends 14 and 16, and a slanting front surface 18 such that the structure can be rested stably in the position shown on a horizontal surface such as a desk, and will then present its front surface in a convenient position for viewing thereof. An upper cylindrical roller 20 and a lower cylindrical roller 22 are mounted beneath and adjacent the front surface of the structure by means of a pair of axial rods 24 and 26 respectively, which axial rods extend slidably and rotatably through the two opposite end faces of the structure by way of a corresponding pair of closely-fitting apertures in each end face. The two apertured end faces therefore provide support for the two axial rods and their associated rollers, while permitting independent rotation of each roller about its axis by manual turning of its axial rod, as well as independent translation side-to-side motion by pushing and pulling on either axial rod. The slanted front face 18 of the support structure serves as a mask covering part of each roller, and is provided with a pair of rectangular apertures 30 and 32 in front of rollers 20 and 22 respectively, each of which apertures exposes to view a portion only of the circumference and a portion only of the length of its associated roller.

A flexible flap 34 is fastened to the back surface 12 of structure 10, and may have an opaque portion 36 and a transparent portion 38 along the front free edge thereof. The location and geometry of the flap 34 is preferably such that when it is folded forward and in contact with the top surface of structure 10, the opaque portion 36 extends substantially up to the edge of the top aperture 30 and the transparent portion 38 can then be fitted into top aperture 30 to hold the flap in its downward position while still exposing to view the portion of roller 20 beneath aperture 30.

A century indicator 40 is provided on the top portion of support structure 10 and normally lies under the opaque part of flap 34 when the flap is folded downward, but is exposed when flap 34 is raised to the position shown in broken lines. Additional indicators are also provided; a leap-year indicator 42 on the upper roller 20, a month indicator 44 on the lower roller 22, a day-of-the-week indicator 46 on the front of the support structure 10, and a day-of-the-month indicator 48 located below the last-mentioned chart inside structure 10 and partially beneath the large, rectangular lower aperture 50 in structure 10. Indicator 48 is in the form of a slide held between the inner surface of the front face of support structure 10 and a guideway 52, so as to permit sliding of indicator 48 sideways between the ends of the structure to expose various portions thereof by way of aperture 50.

The nature of the various indicators is shown more clearly in the several parts of FIGURE 3, which are enlarged views of the corresponding indicators of FIGURES 1 and 2 with the cylindrically-shaped indicators 42 and 44 being developed flat for purposes of exposition.

As shown in FIGURE 3, month indicator 44 consists of six horizontal rows and thirteen vertical columns of indicia-bearing regions, the spacings between corresponding portions of the regions of adjacent columns being the same for all columns. These regions are of such size that seven consecutive regions of any given row are selectively exposable simultaneously by way of aperture 32. Each region contains one or more numbers indicating the ordinal numbers of the months of the year; for Example 6 represents June and 10 represents October. It is for this reason chart 42 is designated as the month indicator. One such region 56 bears identifying indicia distinguishing it from all other regions of the indicator. This region is used as a key for setting the indicator in various positions, and will be referred to hereinafter as the key region for that indicator.

Indicator 46 comprises one row of seven regions spaced in the same manner as adjacent regions of indicator 44, each successive region of indicator 46 bearing indications of the successive days of the week, from Sunday at the left to Saturday at the right. Accordingly this indicator is designated as the day-of-the-week indicator. Alignment of any month number of month indicator 44 with a given day of the day-of-the-week indicator 46 indicates that the so-numbered month begins on the day of the week with which it is aligned. Various rows of regions of month indicator 44 correspond to different years, and a given year is selected for consideration by rotating the roller 22 until a particular row of regions is centered in the viewing aperture 32, the other rows then being masked. In FIGURE 3 a particular position of the viewing aperture 32 is indicated by the bracket 32A.

The arrangement of regions and the indicia on indicator 44 are such that by rotating roller 22 and shifting it horizontally the portion of the row presented to view through aperture 32 may be made to indicate those months beginning on particular days of the week for any year past, present or future.

The lower slidable indicator 48 comprises 5 rows and 13 columns of regions bearing indicia representative of the days of the month, and the aperture 50 is of a size to expose simultaneously seven of these columns and all of the rows. By sliding the indicator 48 sideways a proper calendar keyed to the days of the week of indicator 46 can be exposed for any given month. By first setting the month indicator 44 to its proper position for the selected year, the calendar or day-of-the-month indicator 48 can then be set accordingly so that it indicates the first day of the month directly beneath the proper day of the week, at which setting a proper calendar for the selected month is presented.

In accordance with the present invention the proper lateral and rotational setting of the roller 22 bearing the month indicator 44 is determined by a lateral setting of the leap-year indicator 42 in relation to the century indicator 40, usually followed by rotational adjustment of the roller 22.

The century indicator 40 contains seven columns of regions aligned with the columns of the day-of-the-week indicator 46, these regions being arranged in a number of rows, in this case five rows, with century indications in various of these regions. For example, in FIGURE 3 the indication "100" on indicator 40 indicates the century beginning with the year 100, the indication "1900" indicates the century beginning with the year 1900, and the indication "2500" indicates the century beginning with the year 2500. It will be understood that the chart can be continued vertically in either direction to provide indications of centuries even more remote from the present. For example, each of the columns marked with an asterisk may be extended downwardly, with successive numbers indicating dates 400 years further in the future, up to March 1 of the year 4800. Instructions for so extrapolating these columns may be contained on the lower portion 60 of indicator 40 in written matter indicated schematically thereon in the figure.

The top roller-type indicator 42, designated as the "leap-year" indicator, may be divided into thirteen columns of regions spaced the same as the columns of chart 44, these regions being arranged in at least four horizontal rows of leap-year indicating indicia. The center, or seventh, column 64 of regions is marked with identifying indicia to distinguish it from the other columns of indicator 40, as by partially coloring it red, for example. In the form shown, the upper portion 62 of indicator 42 may be utilized to provide written instructions for the setting of leap-year indicator 42 with respect to century indicator 40 and for the subsequent setting of the month indicator 44, such instructions being indicated schematically in the figure.

The leap-year indicator 42 is set laterally by sliding the rod 24 sideways until the column of regions 64 bearing the identifying indicia mentioned above is located directly below and in line with that region of the century indicator 40 representing the century containing the month whose calendar representation is desired. Roller 20 bearing leap-year indicator 42 is then rotated by means of axial rod 24 until there are visible through the aperture 30 indicia, in this case the last two numerals, of the year desired, if the year desired is a leap year; otherwise the last two numerals of the leap year immediately preceding the desired year are exposed in this way. In FIGURE 3 such a position of aperture 30 is indicated by bracket 30A. The month indicator 44 is then rotated and slid until the key region 56 thereof is aligned directly below the indicia for the selected leap year. The row of month indicator 44 then visible through the aperture 32, designated herein as the "key-region" row, then indicates, by alignment with the day-of-the-week indicator 46, those months of the selected leap year which begin on particular days of the week. If the desired year was not a leap year, but one of the three intermediate years following a given leap year, the roller 22 bearing indicator 44 is turned to move the visible rows thereof upward, in effect causing the aperture 32 to scan downward over indicator 44, one row for each year by which the desired year exceeds the selected leap year. Alternatively, a year preceding the selected leap year by one, two or three years may be displayed by rotating roller 22 in the opposite direction, one row for each preceding year.

Due to peculiarities in the history of the development of the modern calendar there are a few special areas of time for which special calendar-setting procedures should be observed. While for century years prior to 1800 the leap-year indicator is set as described above, starting with the century year 1800 dates between January 1 and March 1 of any century year are treated as if lying in the preceding century for purposes of setting the leap-year indicator with respect to the century indicator; also in this case, when the leap-year indicator has been thus set the key region of the month chart is aligned not with the usual '00 indication of a century year on the leap-year indicator, but with one of the regions specially marked as 100 in the lowest row of the leap-year indicator of FIGURE 3. In all other cases the ordinary procedure described previously is employed. In addition it is noted that two different century columns are used, as shown in the century indicator, for dates in the 1700's depending on whether they are before September 2, 1752 or after September 14, 1752.

For example, to obtain a calendar indication for the month of July of 1908 (or of 408, 1108 or 2308), the roller 20 bearing the leap-year indicator 42 is slid sideways until the column 64 thereof bearing the distinguishing indicia mentioned above is aligned directly under that column in the century indicator 40 which bears indications of the century beginning in 1900, and then turned until the region marked '08 is exposed, which is the position thereof represented in FIGURE 3. The roller 22 bearing the month indicator 44 is then rotated and slid sideways until the key region 56 is located directly below and in line with the region of indicator 42 indicating the leap year '08 and so as to be aligned for viewing through aperture 32. In the thus-exposed row of the month indicator 44, the month of July is indicated by the numeral 7, which in this example happens to appear in the key region 56 directly above the region of indicator 46 which indicates Wednesday. Accordingly the calendar, or day-of-the-month indicator 48 is slid sideways to the position shown in which the indication of the first day of the month is aligned directly below the Wednesday region of chart 46, as shown in FIGURE 3, in which position the indicator 48 and the day-of-the-week indicator 46 together comprise a proper calendar for the days in July of 1908.

Similarly, if the proper calendar indication for the month of June of a non-leap year such as 1963 is desired, the indicia column 64 of the leap-year indicator 42 is positioned so as to be aligned directly below the column of the century indicator 40 containing an indication of the century beginning with 1900, the roller 20 is then rotated without sidewise motion to expose the region of indicator 42 representing the year 1960 through aperture 30 and the key region of the month indicator 44 is aligned beneath the indication of '60 in the leap-year indicator 42 and is then rotated upward by three rows to present through aperture 32 a row of month indicator 44 in which the region representing the sixth month of the year, namely June, appears above the indication of Saturday in the day-of-the-week indicator 46. The day-of-the-month indicator 48 is then slid sideways until the numeral 1 appears aligned beneath the indication of Saturday in the day-of-the-week indicator 46. The latter indicator then indicates that the month of June 1963 begins on a Saturday, and the remainder of indicator 48 shows the proper relationship between the days of the week and the days of the month of June 1963.

With the latter adjustment of the perpetual calendar it is noted that the seven successive regions of the leap-year indicator 42 contain indicia representing successively, starting at the left, the leap years 1956, 1968, 1980, 1964, 1976, 1960 and 1972. These represent all of the leap years between 1956 and 1980 inclusive, and therefore this setting of the leap-year indicator can be used to obtain a proper calendar indication for any year in this region of time, without further recourse to the century indicator 40.

This latter fact may be used to advantage in a simplified form of the invention represented in FIGURE 4, which may be identical with that embodiment represented in FIGURES 1, 2 and 3 with the exception that the century indicator is eliminated and the leap-year roller and indicator is replaced by a set of seven fixed, leap-year-indicating elements, *a, b, c, d, e, f, g*, each aligned with a different region of the day-of-the-week chart 46 and representing, in succession from left to right, the leap years 1956, 1968, 1980, 1964, 1976, 1960 and 1972. To obtain an indication of the days of the week on which the various months begin in any year in this general region of time, the key region of the month indicator 44 is again set directly beneath the leap year of interest, or the leap year immediately preceding the year of interest, in which case the month indicator is in proper position if a leap year was selected; if a leap-year was not selected, then month indicator 44 is turned upward by one row for each succeeding year, as described earlier. The month indicator then indicates that the months numerically represented thereon begin on the days of the week immediately below each so-indicated month. Accordingly, with this apparatus the proper setting for the calendar chart can be determined without requiring any mental calculations and without requiring a century chart or an adjustable leap-year chart.

However, it will be understood that the columnar region containing each leap-year indicating element in FIGURE 4 may also contain three other indicia corresponding to the indicia contained in the other three rows of the leap-year indicator of FIGURE 3, so that any year in the 20th century may be selected by setting the key region of the month chart under the appropriate leap-year column as in the FIGURE 3 embodiment.

FIGURES 5, 6 and 7 represent an embodiment of the invention in a perpetual calendar of over-all cylindrical shape suitable for mounting on a pen, pencil or similar cylindrical object. In this form the invention comprises a cylindrical tube 70 of plastic, glass, or similar material having an inner-diameter to fit snugly around a pencil 72. A cylindrical month indicator 74 of paper or the like, bearings rows and columns of regions containing month indications as shown developed flat in FIGURE 7, surrounds supporting cylinder 70 and is affixed thereto as by suitable cement, and in turn is covered by a concentric smooth-surfaced cylinder 76 which may be of clear plastic or similar transparent material serving to protect the month indicator and permit easy motion thereover of a cyluindrical day-of-the-month calendar indicator 78. The indicator 74 is again in the form of orthogonal rows and columns of indicia as shown in the development of FIGURE 7, the columns being disposed axially of the supporting cylinder 70 and of the pencil 72.

The day-of-the-month indicator 78 in this case is in the form of a cylinder of paper or similar material covered by, and affixed to, an outer concentric protecting cylinder 80 of a suitable transparent material such as plastic. The latter chart is similar to that in the above-mentioned patent, consisting of a spiral arrangement of indicia indicating successive days of the month as shown in FIGURE 7.

Another cylindrical indicator 84 of paper, cardboard or the like, preferably covered by and adhering to a concentric transparent cylinder 86, is provided with an inner diameter such as to fit slidingly but snugly over the upper end of inner support cylinder 70. As is shown developed in FIGURE 7, the indicator 84 consists of seven columnar regions spaced the same as the columns of the month indicator 74 and the day-of-the-month indicator 78, these seven columnar regions bearing, in sequence, indicia indicative of the seven successive days of the week. In addition, as further shown by FIGURE 7 starting with the column region at the left indicating Sunday and proceeding toward the right, the latter indicator bears indicia, in the successive columnar regions, of leap-years 1956, 1968, 1952, 1964, 1976, 1960 and 1972.

To use this form of perpetual calendar to provide a suitable day-of-the-month calendar indication for any given year within the general range extending from 1952 to 1972 and immediately thereafter, the top cylindrical indicator 84 bearing indications of the days of the week and of leap years is rotated with respect to the support directly below the row in the month chart bearing the key region 90 of indicator 74 is aligned with the leap year coinciding with or immediately preceding the selected year. The day-of-the-month indicator 78 is then placed directly below the row in them onth chart bearing the key region and is moved downwardly one row for each year, if any, by which selected year exceeds the selected leap year. Indicator 78 is then turned, without axial motion, until the indication on the day-of-the-month indicator of the first day lies directly beneath the region of the month indicator indicating the number of the selected month. The alignment of the columns of the day-of-the-month indicator 78 with the day-of-the-week indicia of indicator 84 then provides a proper calendar indication for the selected month of the selected year.

Again, if it is desired to provide coverage for a complete century, each of the seven columnar regions of indicator 84 may also be provided with three additional leap-year indicia as illustrated in FIGURE 3. Accordingly, there is provided a simple perpetual calendar arrangement adapted to fit conveniently over the end of a pencil or similar object and which can be set to provide a proper calendar indication of any month in a predetermined span of about 100 years, without requiring any knowledge of calendar relationships and without requiring any mental steps, but using merely simple physical alignment of the several parts thereof.

FIGURES 8, 9 and 10 show another embodiment of the invention, in front, side-section and back views respectively, in which a flat, rectangular month indicator 100 having an arrangement of regions and indicia like those of the month indicator 44 of FIGURES 1, 2 and 3, is mounted to be readily slidable in all directions in a given plane, within a space provided between two opposed plane members 102 and 104 of cardboard or the like, which members are held together near their periphery in any suitable way with an appropriate spacer 106 between them so as to provide a region in which indicator 100 may be readily slid while retaining any given position by friction with the above-mentioned opposed members 102 and 104. Access to the month indicator 100 for purpose of adjustment may be had by providing a suitably large aperture 108 in the back of plane member 102 so as to permit manual adjustment of the position of month indicator 100. A third plane member 110, which again may be of cardboard or similar material, is mounted in front of plane member 104 and fastened thereto about the periphery at a spacing therefrom determined by the peripheral spacer 112. A day-of-the-month indicator 114 like that in the previously-described embodiments is adapted to be manually slid horizontally only, in the region between the plane members 104 and 110, by access through a front aperture 116, the latter indicator being held in fixed vertical position by the guiding action of the lower peripheral spacer 112 and a guide strip 118 fixed between plane members 104 and 110 above the day-of-the-month indicator 114.

The aperture 116 is of a form and size, as in the embodiment of FIGURES 1, 2 and 3, to expose to view a portion of indicator 114 representing the arrangement of days-of-the-month of the various months of the year. Also as in the former figures, a day-of-the-week indicator 120, containing seven regions spaced in the same manner as the columns of the day-of-the-month chart, is disposed horizontally on the front of the plane member 110 and aligned with the top of aperture 116. A rectangular aperture 124 through both of the plane members 104 and 110 immediately above the day-of-the-week indicator 120 and co-extensive in length therewith exposes any selected row of the month indicator 100. Similarly, above the aperture 124 and spaced identically with the spacings of the columns of the month indicator 100, the day-of-the-week indicator 120 and the day-of-the-month indicator 114 are seven leap-year indicia elements such as 130, arranged to present in sequence, from left to right, indications of the years 1956, 1968, 1980, 1964, 1976, 1960 and 1972 as in the embodiment of FIGURE 4. Operation of this form of the invention is substantially identical with that of the embodiment described above with reference to FIGURE 4, with the exception that adjustment of the month chart is accomplished by sliding it manually in either of two directions, rather than by one sliding and one rotating action as in the FIGURE 4 embodiment.

FIGURES 11, 12 and 13 show another embodiment of the invention in which the orthogonal straight rows and columns of indicia of the preceding embodiments are replaced by circular rows and angularly-displaced sectors each containing a radial column of indicia, and in which alignment of the various columns of indicia is accomplished by rotation of the several charts.

More particularly, as shown for example in FIGURE 12, this form of our device comprises structurally a substantially planar back member 130 and an opposed, substantially planar front member 132 both of which may be of cardboard or equivalent material, held together near their centers by a rivet 134 and around most of their peripheries by an adhesive. Between these two planar members are located an annular, substantially planar day-of-the-month indicator 136 and a circular, substantially planar month indicator 138 within the central aperture of annular indicator 136 and concentric therewith and with the center of rivet 134. A transparent plastic piece 140 is affixed to the back of annular indicator 136 and extends across the opening therein in front of circular indicator 138 to provide support for annular indicator 136 on rivet 134. Another clear plastic piece 142 is attached to the back of the planar front member 132 and forms a front window for the aperture 144 in front member 142 through which to view the several charts. Annular indicator 136 extends freely somewhat beyond the lower edge of members 130 and 132 at 146 so that it can be rotated manually about rivet 134. To permit manual rotation of the circular indicator 138, a tab 150 is affixed as by adhesive to a part of the back of indicator 138 and extends through an arcuate opening 152 provided in the back planar member 130.

Circular month indicator 138 is divided into five concentric circular rows of regions and 13 sector-shaped columns of regions, each region bearing one or more numerals indicating the numbers representing various ones of the twelve months of the year, together with appropriately-marked key regions. Annular day-of-the-month indicator 136 is also divided into five concentric circular regions and 13 sectoral regions alignable with the sectors of the circular indicator 138. An annular space 154 is provided between the outer edge of circular indicator 138 and the inner edge of annular indicator 136 through which is visible an indicator of the successive days of the week, starting with Sunday at the left and ending with Saturday at the right, supported on the back planar member 130. A similar annular space 156 is provided between the outer edge of annular indicator 136 and the edge of aperture 144 in the front planar member 132, through which is visible another indicator of the successive days of the week, positioned on the back planar member 130 and corresponding to, and angularly aligned with, the above-described inner set of day-of-the-week indications.

On the front face of front planar member 132 and angularly-aligned with the day-of-the-week markings are seven year indicia 160, 162, 164, 166, 168, 170 and 172, representing from left to right in sequence the leap years 1956, 1968, 1980, 1964, 1976, 1960 and 1972.

Operation of the device of FIGURES 11, 12 and 13 is similar to that described with respect to FIGURES 4, 5 and 8 except that all adjustments are made by rotation of circular indicator 138 and annular indicator 136. The key region is set in angular alignment with the leap year indication corresponding to the selected year, or if a leap year is not selected then to the immediately preceding leap year. The key-region circular row then indicates, by its angular alignment with the day-of-the-week markings, the days of the week on which the various months begin in the selected leap year. By counting downward one circular row for each year in excess of the leap year, a row is reached which gives this information for any selected year. With this information, the annular ring is turned until the indication thereon of the first day of the month is angularly aligned with the proper day of the week, and the annular ring and the day-of-the-week indicator then provide a proper calendar for the selected month.

In this case also the leap-year indications may be expanded to cover a complete century, as explained hereinbefore.

It is noted that in certain forms of the invention such as are shown in FIGURES 7 and 11, the month indicator has five rows, the top row containing the usual key region and the bottom row containing another key region. In this case the month indicator can be aligned, as an alternative procedure, by aligning the lower key region with the leap year immediately following a selected non-leap year and effectively counting up on the month indicator one row for each year by which the selected year precedes said following leap year.

While the invention has been described with particular reference to specific embodiments thereof, it may be embodied in many diverse forms without departing from the spirit and scope thereof.

We claim:

1. A perpetual calendar comprising:
a supporting structure;
a day-of-the-week indicator on said structure and comprising seven linearly-arranged regions each indicative of a different day of the week;
a month indicator on said structure comprising a roller having a plurality of rows and at least seven columns of regions each indicative of at least one month of the year, said columns thereof being disposed circumferentially and said rows axially of said roller, said roller being rotatable about its axis and slidable along its axis with respect to said structure, said columns thereof being so disposed as to permit simultaneous alignment of any adjacent seven of said columns with said seven regions of said day-of-the-week indicator; and
a year indicator on said structure comprising at least seven regions each indicative of a different year, said last-named regions being disposed to permit alignment thereof simultaneously with said columns of said month indicator and with said regions of said day-of-the-week indicator.

2. A perpetual calendar comprising:
a supporting structure;
a day-of-the-week indicator on said structure and comprising seven linearly-arranged regions each indicative of a different day of the week;
a month indicator on said structure comprising a plurality of rows and at least seven columns of regions each indicative of at least one month of the year, said month indicator being variably positionable and said columns thereof being so disposed as to permit simultaneous alignment of any adjacent seven of said columns with said seven regions of said day-of-the-week indicator; and
a year indicator on said structure comprising at least seven regions each indicative of a different year, said last-named regions being disposed to permit alignment thereof simultaneously with said columns of said month indicator and with said regions of said day-of-the-week indicator;
at least one of said month indicator and said year indicator comprising a generally cylindrical member mounted on said supporting structure for rotation about its cylinder axis and axially slidable with respect to said structure, said member including a plurality of axially-extending rows and more than seven circumferentially-extending columns of regions bearing indicia.

3. A calendar in accordance with claim 1, comprising also a century indicator comprising seven columns of regions aligned with said regions of said day-of-the-week indicator, said regions of said century indicator being indicative of different centuries.

4. A perpetual calendar comprising:
a supporting structure;
a first generally cylindrical member mounted for rotation about its axis on said structure and axially movable with respect to said structure, said first member including a plurality of axial rows and more than seven circumferential columns of regions bearing indicia of leap-years; and
a second generally cylindrical member mounted for rotation about its axis with respect to said structure and axially movable with respect to said structure, said second member including a plurality of axial rows and more than seven circumferential columns of regions bearing indicia of months of the years, said axis of said second member being generally parallel to said axis of said first member and said second member being mounted to permit alignment of said columns of said second member with said columns of said first member.

5. A perpetual calendar in accordance with claim 4, in which said supporting structure defines first and second substantially rectangular apertures, said first aperture being of a size and disposition to expose substantially only one of said rows of said first member at a time, and said second aperture being of a size and disposition to expose substantially only a single one of said rows of said second member at a time.

6. A perpetual calendar in accordance with claim 4, comprising also a century indicator on said structure containing columns of regions bearing indicia on different centuries, said first and said second members being movable to align said columns thereof with said columns of said century indicator.

7. A perpetual calendar in accordance with claim 4, comprising a day-of-the-week indicator on said structure containing seven regions each indicative of different days of the week, said columns of said first and second members being alignable with said seven regions of said indicator, and also comprising a substantially planar member on said structure containing indications of the days of the month arranged in rows and columns in calendar form, said planar member being movable with respect to said structure to align said columns of said planar member with different ones of said regions of said day-of-the-week indicator.

References Cited by the Examiner

UNITED STATES PATENTS

| 1,069,533 | 8/1913 | Davis | 40—109 |
| 2,998,666 | 9/1961 | Stern | 40—335 |

FOREIGN PATENTS 75,990   3/1919   Austria.

EUGENE R. CAPOZIO, *Primary Examiner.*

JEROME SCHNALL, *Examiner.*

WENCESLAO J. CONTRERAS, *Assistant Examiner.*